(12) United States Patent
Leicht et al.

(10) Patent No.: US 10,953,493 B2
(45) Date of Patent: Mar. 23, 2021

(54) GAS DELIVERY SYSTEM

(71) Applicant: ArvinMeritor Technology, LLC, Troy, MI (US)

(72) Inventors: Phillip Leicht, South Lyon, MI (US); Yang Zhai, Rochester Hills, MI (US); David Earl Rogers, Enka, NC (US)

(73) Assignee: ArvinMeritor Technology, LLC, Troy, MI (US)

( * ) Notice: Subject to any disclaimer, the term of this patent is extended or adjusted under 35 U.S.C. 154(b) by 837 days.

(21) Appl. No.: 15/644,093

(22) Filed: Jul. 7, 2017

(65) Prior Publication Data
US 2019/0009365 A1    Jan. 10, 2019

(51) Int. Cl.
*B23K 26/21* (2014.01)
*B23K 26/08* (2014.01)
(Continued)

(52) U.S. Cl.
CPC .......... *B23K 26/21* (2015.10); *B23K 26/0876* (2013.01); *B23K 26/0884* (2013.01);
(Continued)

(58) Field of Classification Search
CPC .... B23K 26/21; B23K 26/0884; B23K 26/00; B23K 26/0608; B23K 26/0869; B23K 26/123; B23K 26/144; B23K 26/1462; B23K 26/1464; B23K 26/1476; B23K 26/70; B23K 26/706; B23K 26/009; B23K 26/10; B23K 26/14; B23K 26/1438; B23K 26/147; B23K 26/16; B23K 26/703; B23K 15/0046; B23K 2101/006; B23K 9/16; B23K 9/32; B23K 9/326; B23K 37/003; B23K 37/0443; B23K 37/0229; B23K 37/0235; B23K 11/34; B23K 11/36; B23K 15/0026
(Continued)

(56) References Cited

U.S. PATENT DOCUMENTS 5,137,223 A    8/1992  Brandon et al.
6,118,097 A *  9/2000  Kaga ................. B23K 26/1435
                                              219/121.5
(Continued)

FOREIGN PATENT DOCUMENTS

DE    102007023444 B4 *  4/2009  ......... G03F 7/70908

OTHER PUBLICATIONS

Yu, J. et al., "Laser welding of cast iron and carburized steel for differential gear", Journal of Mechanical Science and Technology 25, 2011, pp. 2887-2893.
(Continued)

*Primary Examiner* — Justin C Dodson
*Assistant Examiner* — William C. Gibson
(74) *Attorney, Agent, or Firm* — Brooks Kushman PC

(57) ABSTRACT

A system for making a welded assembly. The system may include a welding system that projects a laser beam that welds a first part to a second part. The system may further include a gas delivery device defining an interior cavity. The
(Continued)

gas delivery device may include an inlet that provides pressurized gas to the interior cavity, and a discharge slot that receives the pressurized gas from the interior cavity and outputs the pressurized gas with substantially laminar flow toward the laser beam.

20 Claims, 4 Drawing Sheets

(51) Int. Cl.
  *B23K 26/14* (2014.01)
  *B23K 37/04* (2006.01)
  *B23K 26/142* (2014.01)
  *B23K 26/24* (2014.01)
(52) U.S. Cl.
  CPC ............ *B23K 26/14* (2013.01); *B23K 26/142* (2015.10); *B23K 26/1438* (2015.10); *B23K 26/24* (2013.01); *B23K 37/04* (2013.01)
(58) Field of Classification Search
  USPC ........ 219/136, 121.39, 121.5, 121.51, 121.6, 219/121.71, 121.66, 121.72, 137 R, 522; 315/111.01, 111.11; 148/525, 565; 250/365, 372, 493.1, 504 R; 264/1.37, 264/400, 409, 482; 372/1–3
  See application file for complete search history.

(56) References Cited

U.S. PATENT DOCUMENTS

| | | | |
|---|---|---|---|
| 6,844,521 B2 | 1/2005 | Staufer et al. | |
| 8,015,899 B2 | 9/2011 | Gianone et al. | |
| 8,037,763 B2 | 10/2011 | Brignac et al. | |
| 8,327,541 B2 | 12/2012 | Harrup et al. | |
| 10,449,560 B2 * | 10/2019 | Ohno | B23K 26/342 |
| 2012/0234804 A1 * | 9/2012 | Ko | B23K 26/244 |
| | | | 219/121.63 |
| 2015/0196974 A1 * | 7/2015 | Rominger | B23K 26/147 |
| | | | 219/121.84 |
| 2016/0074970 A1 | 3/2016 | Zhai et al. | |
| 2016/0121427 A1 | 5/2016 | Montello | |

OTHER PUBLICATIONS

U.S. Appl. No. 15/049,181, filed Feb. 22, 2016.
Tregaskiss, "Consumables Catalog", Mar. 2010.

* cited by examiner

GAS DELIVERY SYSTEM

TECHNICAL FIELD

This disclosure relates to a system and method of making a welded assembly, and more particularly to a gas delivery system.

BACKGROUND

A method of assembling a crown wheel for a differential gear assembly of a vehicle is disclosed in U.S. Pat. No. 8,015,899.

SUMMARY

In at least one approach, a system for making a welded assembly is provided. The system may include a welding system that projects a laser beam that welds a first part to a second part. The system may further include a gas delivery device defining an interior cavity. The gas delivery device may include an inlet that provides pressurized gas to the interior cavity, and a discharge slot that receives the pressurized gas from the interior cavity and outputs the pressurized gas with substantially laminar flow toward the laser beam.

In at least one approach, a system for making a welded assembly is provided. The system may include a welding system that projects a laser beam that welds a first part to a second part. The system may further include a gas delivery device that includes a first body portion having an inlet that receives pressurized gas, and a second body portion disposed on the first body portion. The first and second body portions may cooperate to define an interior cavity and a discharge slot therebetween. The interior cavity may receive pressurized gas from the inlet and the discharge slot may receive pressurized gas from the interior cavity.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Discrete metal components may be welded together through laser welding techniques, such as deep penetration welding. In deep penetration welding, a high-power laser, such as a gas laser or a solid-state laser, may be focused on a workpiece. The focal point of the laser beam is located below the surface of the workpiece. For example, the focal point may be located at a depth of approximately 2-3 millimeters below the surface of the workpiece. In other examples, the focal point may be located at a depth in the range of approximately 6-10 millimeters below the surface of the workpiece. At the focal point, the beam may have a beam width in the range of approximately 200-800 microns. In one example, the beam has a beam width of approximately 300 microns at the focal point. In another example, the beam has a beam width of approximately 600 microns at the focal point.

During deep penetration welding, the laser beam melts the metal workpieces and produces a metallic vapor. The vapor exerts pressure on the molten metal and partially displaces it, forming a weld pool. The result is a deep, narrow, vapor-filled hole, or keyhole, which is surrounded by the molten weld pool. The keyhole and molten weld pool formed by the laser beam may be referred to as the "weld zone." The weld zone is created by the laser beam as the laser beam advances and provides a weld joint between the workpieces. The molten metal solidifies as the weld zone advances, thereby forming the weld between the workpieces.

Figure 1:
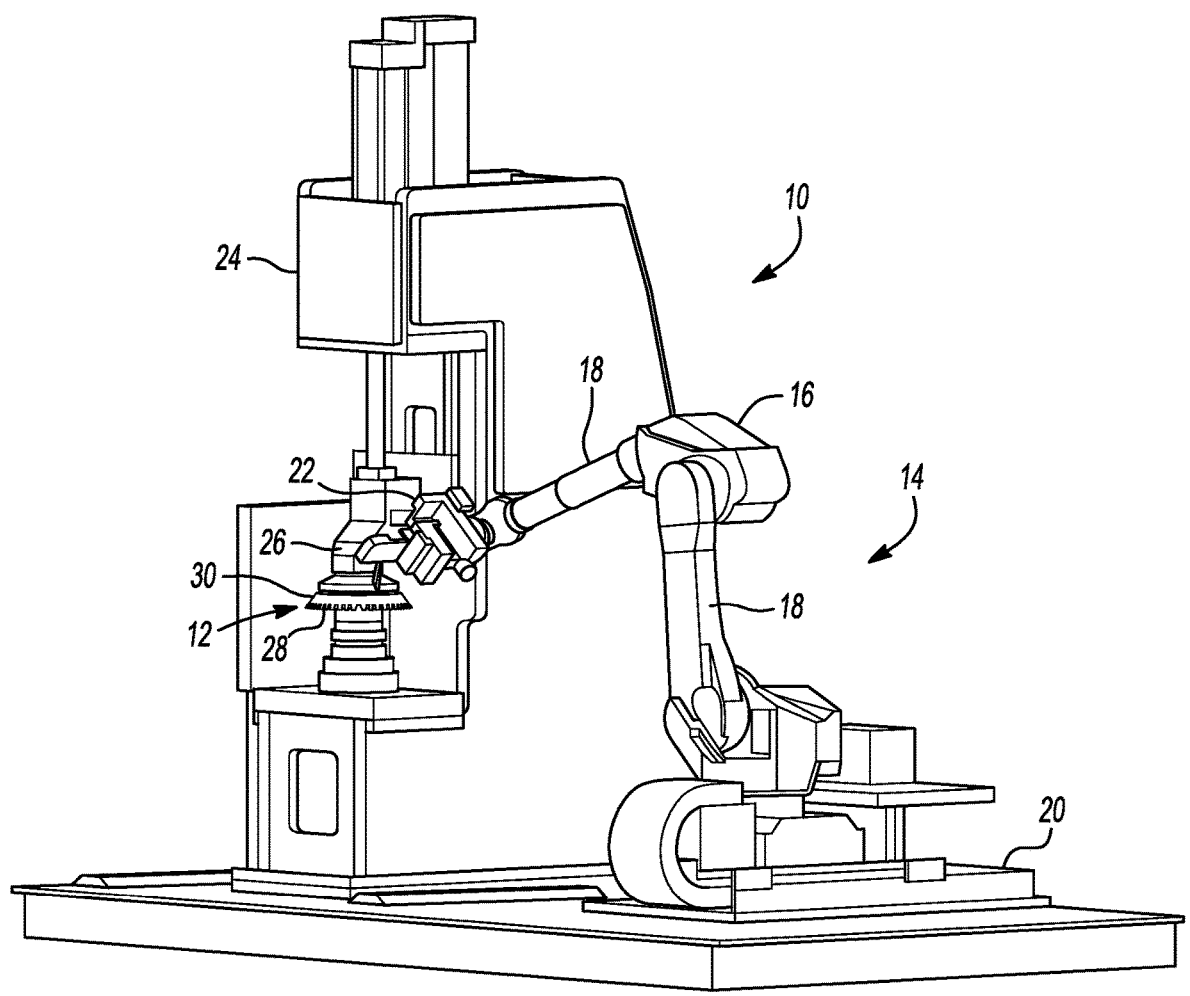
FIG. 1 illustrates a system for making a welded assembly.

Referring to FIG. 1, an example of a system 10 for making a weld assembly 12 is shown. The system 10 may include a laser welding apparatus 14 that may include a multi-axis motion control system, such as a manipulator or robot 16 having one or more movable arms 18. The robot 16 may be moveable along a track 20. The laser welding apparatus 14 may include a laser head 22 attached to a movable arm 18 of the robot 16. The movable arm 18 may be used to position the laser head 22 in relation to the weld assembly 12.

The system 10 may further include a workstation 24, which may be located, for example, in a weld cell. The workstation 24 may include a clamping assembly 26 for supporting the components to be welded or weld assembly 12. The clamping assembly 26 may be adapted to both position and hold the weld assembly 12 during welding. The clamping assembly 26 may also be adapted to rotate the weld assembly 12 (for example, about a central axis of the weld assembly 12) relative to the laser head 22.

The weld assembly 12 may include a first component 28 and a second component 30. The first component 28 and second component 30 may be detached prior to welding and may be coupled together with a weld after welding. The weld assembly 12 may also include three or more components.

In one example, the first component 28 is a first gear component, such as a ring gear. The second component 30 may be a second gear component, such as a differential case or housing. In this example, the first and second components 28, 30 form a differential assembly. In other examples, the weld assembly 12 is a powertrain assembly such as a driven gear assembly, a planetary carrier assembly, a gear shaft assembly, a transmission shaft, or other shaft assembly. In still other examples, the weld assembly 12 is a non-powertrain assembly.

The first component 28 and the second component 30 may be formed of similar or dissimilar materials. In one example, the first component 28 may be a ring gear formed of steel. The second component 30 may be a differential case formed of cast iron. In another example, the first component 28 and the second component 30 may both be formed of steel. In still another example, the first component 28 and the second component 30 may both be formed of cast iron.

Figure 2:
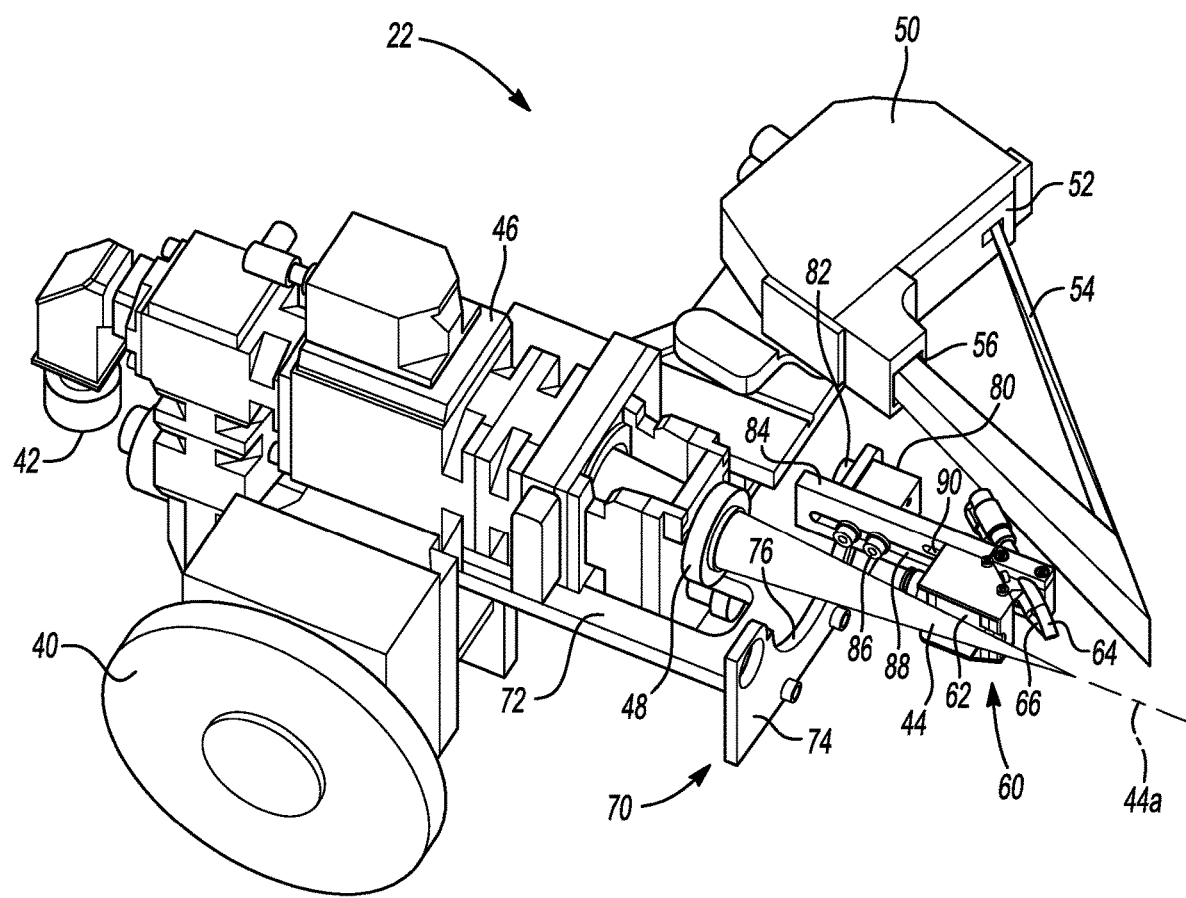
FIG. 2 is a perspective view of a portion of the system including a laser head.

Referring to FIG. 2, a laser head 22 includes an attachment plate 40 adapted to secure the laser head 22 to a multi-axis control system, such as the manipulator or robot 16 of FIG. 1. The laser head 22 further includes a laser input 42 for receiving a laser beam 44 from a laser beam source or laser beam generator. The laser may be of any suitable type, such as a gas laser (e.g., $CO_2$) or a solid-state laser (e.g., a ytterbium-doped fiber laser or a Nd:YAG laser). The laser beam 44 may be directed through a beam projector 46 of the laser head 22. The laser head 22 may further include one or more lenses or beam-shaping components 48.

The laser head 22 may further include a seam tracking device 50. The seam tracking device 50 may include a tracking laser projector 52 adapted to project a tracking laser 54 onto the weld assembly 12; for example, at a weld zone between the first and second components 28, 30 of the weld assembly 12. The tracking laser projector 52 may include one or more laser diodes and laser optics (e.g., laser collimators). The seam tracking device 50 may further include an optical tracking device 56, such as a camera. The camera may be disposed at a triangulation angle relative to the tracking laser 54. The seam tracking device 50 may be used to monitor welding operations performed by the laser head 22. For example, the seam tracking device 50 may be adapted to detect and report weld seam variations, discontinuities, or other irregularities.

The laser head 22 may further include a local delivery system 60. The local delivery system 60 may include a gas delivery device 62, a shield gas delivery device 64, and a wire feeder 66.

The gas delivery device 62, which may be referred to as a cross-jet head, may be connected to a first gas source and may deliver a gas at a relatively high airflow speed. For example, the gas delivery device 62 may provide gas at a pressure of approximately 80 psi (552 kPa) or more. The gas may be of any suitable type, such as air, nitrogen, argon, or combinations thereof. For convenience in reference, the term "airflow" may be used to refer to the flow of gas provided by the gas delivery device 62 regardless of whether the type of gas employed.

The gas delivery device 62 may be disposed in proximity to the weld zone such that the flow of air projected by the gas delivery device 62 forms a high-velocity gas barrier above or adjacent to the weld zone. For example, the gas delivery device 62 may be disposed such that the gas barrier is spaced at least 10 millimeters above the weld zone. In at least one approach, the gas delivery device 62 forms the gas barrier approximately 25-30 millimeters above the weld zone. In this way, the gas barrier formed by the gas delivery device 62 may be located such that it does not interfere with the weld zone. The gas barrier produced by the gas delivery device 62 may inhibit molten metal that may be expelled from the weld zone (e.g., in the form of sparks or spatter) from reaching lenses or other components of the laser head 22. The gas barrier may also clear vapor or smoke from the weld zone. In this way, the laser beam 44 may pass from the laser head 22 to the weld zone substantially free from interference.

A collection system may also be provided with the system 10. The collection system may be disposed on an opposite side of the weld zone from the gas delivery device 62. The collection system may be, for example, a dust collection system or a filtering device. In this way, particulates swept up by the high-speed gas flow produced by the gas delivery device 62 may be directed to and collected at the collection system.

Figures 3, 4:
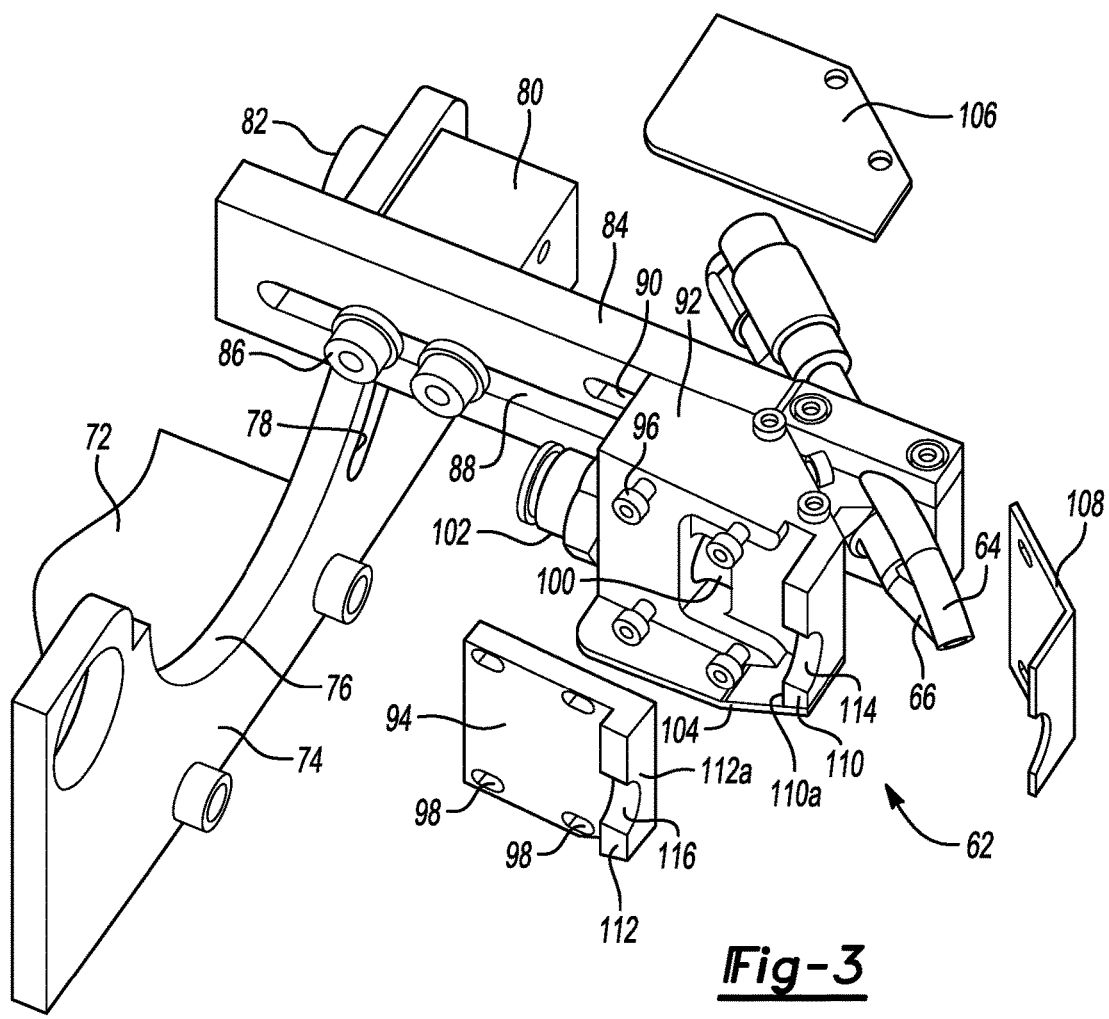
FIG. 3 is an exploded perspective view of a local delivery system that may be provided with the system.
FIG. 4 is a side elevational view of the local delivery system.

The shield gas delivery device 64, which may be referred to as a shield gas nozzle, may be connected to a second gas source and may deliver a gas, such as an inert gas such as argon, helium, or carbon dioxide, to the weld zone of the weld assembly 12. The shield gas delivery device 64 may be disposed proximate or adjacent to the gas delivery device 62. In FIGS. 2-4, the shield gas delivery device 64 may direct the gas at a non-zero angle (e.g., in the range of approximately 10°-45°) relative to the direction of the high-speed airflow produced by the gas delivery device 62. It is also contemplated that the shield gas delivery device 64 may direct gas at other angles, including but not limited to parallel to the direction of the high-speed airflow produced by the gas delivery device 62.

With reference to FIG. 4, the shield gas delivery device 64 may be offset (e.g., vertically offset) from the weld zone to accommodate the wire feeder 66. In such approaches, the shield gas delivery device 64 may have a distal end 64a disposed at a non-zero angle (e.g., 15°-45°) relative to a body portion 64b of the shield gas delivery device 64 to direct the shield gas toward the weld zone.

The shield gas delivery device 64 may provide a controlled atmosphere for the weld zone while the weld zone is in the molten phase. By providing a shield gas to the weld zone, the shield gas delivery device 64 may reduce the likelihood of unwanted chemical reactions such as oxidation or hydrolysis during welding operations. Such chemical reactions may cause undesirable welding characteristics, such as porosity in the solidified weld zone.

The wire feeder 66 may also be disposed at a side of the gas delivery device 62 opposite the laser beam 44. In at least one approach, the wire feeder 66 is a cold wire feeder. In another approach, the wire feeder 66 is a hot wire feeder adapted to carry electric current. The wire feeder 66 may be connected to a wire reel that supplies an electrode wire or welding wire to the wire feeder 66. The wire feeder 66 may also be connected to a feeding or transfer mechanism that transfers the welding wire from the wire reel to the wire feeder 66.

An end of the wire feeder 66 may be adapted to deliver a tip end of the welding wire to the weld zone. A welding wire may be employed when welding dissimilar materials, or when the joint between workpieces includes a gap, mismatch, or other irregularity.

Figure 5:
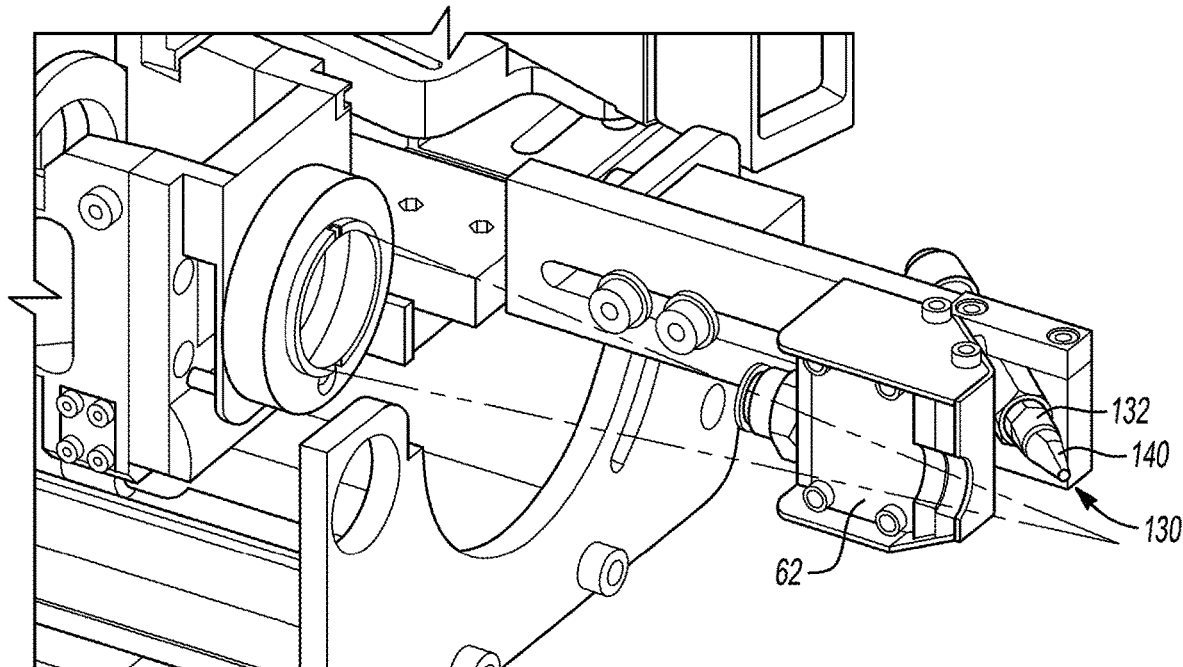
FIG. 5 is a perspective view of the laser head including an integrated feeder nozzle.
Figure 6:
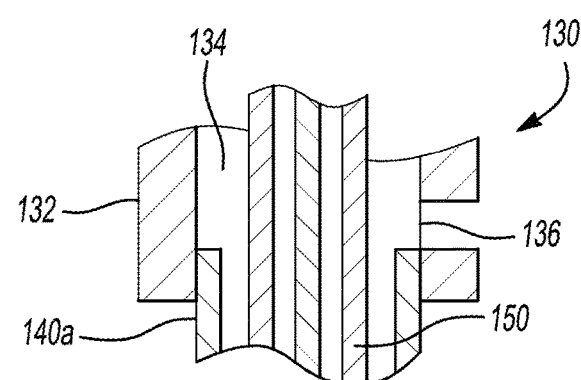
FIG. 6 is a cross-sectional view of the integrated feeder nozzle.
Figure 6:
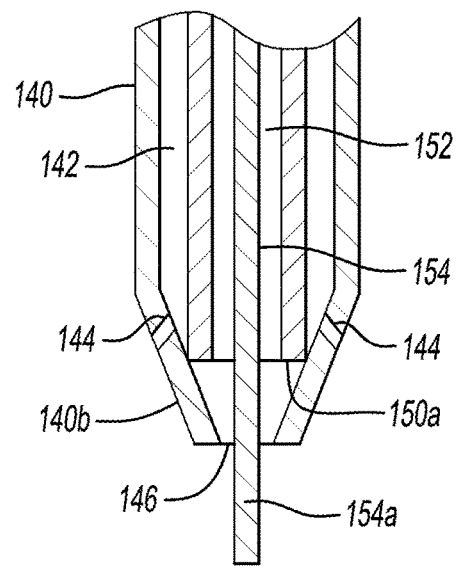

In at least at least one approach, such as is shown in FIGS. 1-4, the wire feeder 66 may be disposed adjacent to and may be spaced apart from the shield gas delivery device 64. In at least one other approach, such as is shown in FIGS. 5 and 6, the wire feeder 66 may be disposed in the shield gas delivery device 64.

Referring to FIG. 2, one or more components of the local delivery system 60 may be secured to a support assembly 70. The support assembly 70 may include a first support member 72 and a second support member 74. The second support member 74 may be rigidly secured to the first support member 72 and may be disposed, for example, in a plane extending generally orthogonal to a central axis 44a of the laser beam 44. The second support member 74 may include a reduced height region 76 defining a passage through which the laser beam 44 may pass. For example, the reduced height region 76 may be a curved region defining the passage through which the laser beam 44 may pass. With reference to FIG. 3, the second support member 74 may further include a guide track 78. The guide track 78 may extend through the entire thickness of the second support member 74 or through less than the entire thickness of the second support member 74. The guide track 78 may be a curved guide track, and may define a curvature that generally corresponds to a curvature of the reduced height region 76.

The support assembly 70 may further include a positioning block 80. The positioning block 80 may be secured to the second support member 74. For example, the positioning block 80 may include one or more fasteners 82 (e.g., cap head screws, thumb screws, bolts, or knobs) that extend into or through the guide track 78 of the second support member 74. In this way, the position of the positioning block 80 relative to the second support member 74 may be adjusted by moving the fasteners 82 of positioning block 80 through the guide track 78 of the second support member 74. Movement of the positioning block 80 relative to the second support member 74 may serve to rotate one or more of the components of the local delivery system 60 about the central axis 44a of the laser beam 44.

A third support member 84 may be secured to the positioning block 80. The third support member 84 may be disposed, for example, in a plane extending generally parallel to the central axis 44a of the laser beam 44.

The third support member 84 may define a first guide track 88. In at least one approach, the first guide track 88 extends through the entire thickness of the third support member 84 or through less than the entire thickness of the third support member 84. The first guide track 88 may be an elongated guide track and may extend along a length of the third support member 84.

One or more fasteners 86 of the positioning block 80 may extend into or through the first guide track 88 of the third support member 84 to secure the third support member 84 to the positioning block 80. The fasteners 86 may be in the form of cap head screws, thumb screws, bolts, knobs, or other fasteners or guides. The fasteners 86 may permit the position of the third support member 84 to be adjusted relative to the positioning block 80 (and relative to the second support member 74). For instance, an axial position of the third support member 84 may be adjusted. In this way, one or more of the components of the local delivery system 60 may be positioned along the central axis 44a of the laser beam 44.

The third support member 84 may also include a second guide track 90. The second guide track 90 may receive one or more fasteners of the gas delivery device 62. In this way, an axial position of the gas delivery device 62 on the third support member 84 may be adjusted relative to the shield gas delivery device 64, the wire feeder 66, or both.

As shown in FIG. 3, the gas delivery device 62 may include a first body portion 92 and a second body portion 94. The second body portion 94 may be secured to the first body portion 92 by one or more fasteners 96. The second body portion 94 may include one or more elongated adjustment apertures 98 that may be sized to receive the one or more fasteners 96. The fasteners 96 may be adapted to secure the second body portion 94 to the first body portion 92, for example, by tightening the fasteners 96. The second body portion 94 may be secured to the first body portion 92 in a first axial position (e.g., along an axis parallel to the central axis 44a of the laser beam 44) relative to the first body portion 92. The fasteners 96 may also be adapted to permit the second body portion to move to a second axial position relative to the first body portion 92. For example, loosening or removing the fasteners 96 may permit the second body portion 94 to axially slide in the upstream or downstream direction. The fasteners 96 may then secure the second body portion 94 to the first body portion 92 in the second axial position, for example, by tightening the fasteners 96. In this way, the second body portion 94 may be axially adjustable relative to the first body portion 92.

In at least at least one approach, the first body portion 92 and the second body portion 94 may be integrally formed such that the gas delivery device 62 has a unitary or one-piece construction.

When assembled, the first body portion 92 and the second body portion 94 may cooperate to define an interior cavity 100 or plenum of the gas delivery device 62. A gas interface 102 may be secured at a first end to a conduit connected to a gas source and may be secured at a second end to the gas delivery device 62 (e.g., at the first body portion 92). The gas interface 102 may be in fluid communication with the interior cavity 100 of the gas delivery device 62 to provide gas from the gas source to the interior cavity 100.

The gas delivery device 62 may also include a bottom plate 104, a top plate 106, a side plate 108, or combinations thereof. The bottom, top, and side plates 104, 106, 108 may be removably coupled to the gas delivery device 62. In this way, the bottom, top, and side plates 104, 106, 108, which may be subjected to high heat and spatter expelled from the weld zone, may be replaced over time.

The bottom, top, and side plates 104, 106, 108 may be made of the same material or a different material as the first body portion 92. For example, the first body portion 92 may be formed of aluminum, and one or more of the bottom, top, and side plates 104, 106, 108 may be formed of steel. In this way, the first body portion 92 may be formed of a relatively lightweight material that is suitable for machining, while steel bottom, top, and side plates 104, 106, 108 may protect the first body portion 92 from spatter expelled from the weld zone. In still other approaches, one or more of the bottom, top, and side plates 104, 106, 108 may be coated with a heat-resistant material.

Referring to FIG. 4, the first body portion 92 may include a wall 110 that may extend in a plane substantially orthogonal to the central axis 44a of the laser beam 44. The second body portion 94 may similarly include a wall 112 that may extend in a plane substantially orthogonal to the central axis 44a of the laser beam 44. In this way, the walls 110, 112 may be referred to as transverse walls 110, 112. The transverse wall 112 of the second body portion 94 may extend, for example, 5 millimeters from the second body portion 94.

The transverse walls 110, 112 may include inner surfaces 110a, 112a for directing an airflow. The inner surfaces 110a, 112a may be disposed in parallel, or substantially parallel, spaced apart planes that extend substantially orthogonal to a gas input flow direction at the gas interface 102.

In at least at least one approach, the transverse walls 110, 112 of the first and second body portions 92, 94 may include respective beam passage channels 114, 116. In the assembled configuration, the beam passage channels 114, 116 of the transverse walls 110, 112 of the first and second body portions 92, 94 may be substantially aligned. During welding operations, the transverse walls 110, 112 may be disposed such that the beam passage channels 114, 116 are positioned along a central axis of the laser beam 44 such that the laser beam 44 passes through the channels 114, 116. In some approaches, side plate 108 may also define a beam passage channel that may also be aligned with beam passage channels 114, 116 to permit passage of the laser beam 44 therethrough.

Referring to FIG. 4, inner surfaces 110a, 112a of the transverse walls 110, 112 may define sidewalls of an airflow channel, such as discharge slot 120. The discharge slot 120 may be an elongated slot (or slit) having a height substantially greater than a width of the elongated slot. For example, the discharge slot 120 may form a generally rectangular discharge slot 120. As shown, the bottom plate 104 and the top plate 106 may define bottom and top walls, respectively, of the discharge slot 120.

Due at least in part to the orientation of the inner surfaces of the transverse walls 110, 112 relative to the interior cavity 100, the gas delivery device 62 may cause the airflow to "bend" or change direction. For example, the airflow may bend or change direction by approximately 90 degrees after exiting the gas interface 102, after reaching the second body portion 94, and/or when being directed to the discharge slot 120. In this way, the transverse walls 110, 112 may cause the airflow to exit through the discharge slot 120 along a plane extending at an angle relative to a central axis of the laser beam. The discharge slot 120 may direct airflow in a plane substantially orthogonal to the central axis of the laser beam.

The discharge slot 120 may be disposed such that the airflow is directed over the weld zone of the weld assembly 12 at a height, for example, of approximately 25-30 millimeters above the weld zone. In this way, the gas delivery device 62 may form an airflow barrier over the weld zone without interfering with the keyhole or molten weld pool of the weld zone.

The transverse walls 110, 112 may define the height of the discharge slot 120. In at least one approach, the discharge slot 120 may extend along substantially the entire height of the transverse walls 110, 112. For example, the discharge slot 120 may extend from top portion of the transverse walls 110, 112 (e.g., from the top plate 106), through the beam passage channels 114, 116, and to bottom portions of the transverse walls 110, 112 (e.g., to the bottom plate 104). In this way, the transverse walls 110, 112 may define a discharge slot 120 in the form of a continuous slot.

In at least one approach, the height of the discharge slot is in the range of approximately 20 millimeters and 100 millimeters, and more particularly, in the range of approximately 40 millimeters and 60 millimeters. For example, the height of the discharge slot 120 may be approximately 50 millimeters. Increasing the height of the airflow may, for example, increase the height of the airflow barrier flowing above the weld zone. As compared to gas delivery devices having heights of approximately 5 to 10 millimeters, the larger airflow barrier propelled through the discharge slot 120 of the gas delivery device 62 may reduce or eliminate "edge effects" above the weld zone.

A larger airflow barrier may also form a "blanket" layer above the shield gas provided by the shield gas delivery device 64. This blanket layer may inhibit dissipation of the shield gas away from the weld zone of the weld assembly 12, thereby maintaining the controlled atmosphere provided by the shield gas at the weld zone. Furthermore, by stabilizing the shield gas layer, the blanket layer may permit a user to adjust one or more parameters of the shield gas delivery system. For example, a user may reduce the velocity of the shield gas exiting the shield gas delivery device 64. Reducing the velocity of the shield gas across the weld zone may reduce the likelihood of the shield gas disrupting the weld pool, and may further reduce the likelihood of molten spatter ejection from the weld zone.

The transverse walls 110, 112 may also define the width of the discharge slot 120. The width of the discharge slot 120 may extend between inner surfaces 110a, 112a of the transverse walls 110, 112 in a direction generally orthogonal to the height of the discharge slot 120 (e.g., parallel to the central axis 44a of the laser beam 44.

In at least one approach, the width of the discharge slot is in the range of approximately 0.2 millimeters and 3 millimeters. For example, the width of the discharge slot 120 may be in the range of approximately 0.5 millimeters to 1 millimeter. In this way, the discharge slot 120 may have a height in the range of approximately 10 to 100 times, and more particularly, 40 to 60 times greater than the width of the discharge slot. In one example, the discharge slot 120 has a height of approximately 50 millimeters and a width of approximately 1 millimeter, thus having a height-to-width ratio of approximately 50:1. In another example, the discharge slot 120 has a height of approximately 50 millimeters and a width of approximately 0.5 millimeters, thus having a height-to-width ratio of approximately 100:1.

In at least one approach, the width of the discharge slot 120 may be constant along an entire height of the discharge slot 120. In another approach, the width of the discharge slot 120 may vary along the height of the discharge slot 120.

The width of the discharge slot 120 may be controlled by adjusting the second body portion 94 relative to the first body portion 92. For example, the elongated adjustment apertures 98 may permit a user to slide the second body portion 94 axially relative to the first body portion 92 from a first position defining a first distance between the transverse walls 110, 112 of the first and second body portions 92, 94 to a second position defining a second distance between the transverse walls 110, 112 of the first and second body portions 92, 94. Reducing the width of the discharge slot 120 may increase airflow velocity. Increasing the velocity of the airflow may provide an "air-knife" or air-knife effect capable of clearing spatter and other debris away from the weld zone.

The discharge slot 120 may configured to provide laminar airflow or substantially laminar airflow. Laminar flow may be defined as streamline flow of a fluid in which the direction of flow at every point remains constant or in which all particles of the fluid move in distinct and separate lines. Laminar airflow may be free of swirls or eddies at a central axis of the laminar flow as the laminar airflow flows over the weld zone. Substantially laminar airflow may be substantially free of swirls or eddies at a central axis of the substantially laminar flow as the substantially laminar airflow flows over the weld zone. The central axis of the laminar or substantially laminar flow may be located at approximately half of the height of the discharge slot 120.

Laminar flow may be contrasted with turbulent flow, which may be produced by devices having circular or elliptical cross-sectional profiles. Turbulent airflow may be substantially comprised of swirls or eddies at a central axis of the turbulent flow as the turbulent airflow flows over the weld zone. In this way, as compared to a turbulent airflow, the laminar airflow may provide a more consistent and predictable airflow pattern above the weld zone.

The shield gas delivery device 64 and the wire feeder 66 may be discrete units secured within the local delivery system 60.

Referring to FIGS. 5 and 6, the wire feeder and the shield gas device form an integrated feed nozzle 130.

The integrated feed nozzle 130 may include an inlet manifold 132 defining an interior cavity 134. The inlet manifold 132 may be formed, for example, of copper, aluminum, steel, or other suitable material.

The inlet manifold 132 may include a shield gas inlet 136 disposed through a wall of the inlet manifold 132. The shield gas inlet 136 may be formed in a side wall of the inlet manifold 132. As such, the shield gas inlet 136 may have a central axis disposed at an angle generally orthogonal to a central axis of the inlet manifold 132.

The shield gas inlet 136 may be sized to receive a first end of a conduit. A second, opposite end of the conduit may be secured a shield gas source that contains, for example, an inert gas such as argon, helium, or carbon dioxide. In this way, gas supplied by the shield gas source may be in fluid communication with the interior cavity 134 of the inlet manifold 132. Gas flow may be regulated by a pressure regulator.

The integrated feed nozzle 130 may also include a nozzle body 140. The nozzle body 140 may also be referred to as a gas diffuser. The nozzle body 140 may define a proximal region 140a having a substantially constant diameter and a conical distal region 140b. The conical distal region 140b may define a conically-tapered wall that progressively tapers from the proximal region 140a a central axis of the nozzle body 140.

The nozzle body 140 may be secured to the inlet manifold 132. For instance, a proximal region 140a of the nozzle body 140 is disposed in a coaxial configuration relative to the inlet manifold 132.

The nozzle body 140 may be susceptible to high wear. Thus, the nozzle body 140 may be configured to be replaced. In at least one approach, the outer surface of the proximal region 140a of the nozzle body 140 may include one or more threads for threadedly engaging corresponding threads on the interior surface of the end portion of the inlet manifold 132. In another approach, the proximal region 140a may be press-fit into the end portion of the inlet manifold 132. In these exemplary approaches, the proximal region 140a of the nozzle body 140 may be partially disposed within the interior cavity 134 of the inlet manifold 132. In still other approaches, the interior surface of the proximal region 140a may engage an exterior surface of the end portion of the inlet manifold 132 such that the inlet manifold 132 is received within the proximal region 140a of the nozzle body 140.

The nozzle body 140 may be a hollow nozzle body defining an interior channel 142. The interior channel 142 of the nozzle body 140 may be fluid communication with the interior cavity 134 of the inlet manifold. In this way, gas supplied by the shield gas source to the interior cavity 134 of the inlet manifold 132 may flow into the interior channel 142 of the nozzle body 140.

The nozzle body 140 may be formed of a material having a high thermal conductivity. In at least one approach, the nozzle body 140 may be formed of a metal or metal alloy.

The nozzle body 140 includes one or more peripheral apertures 144 that may extend through the nozzle body 140. For example, the nozzle body 140 may include eight peripheral apertures 144 radially spaced about the central axis of the nozzle body 140. The peripheral apertures 144 may be in the form of conical apertures, cylindrical apertures, elongated slits, or may have any other suitable geometry. In at least one approach, such as is shown in FIG. 6, central axes of the peripheral apertures 144 may extend at non-zero angles (e.g., in the range of approximately 10°-45°) relative to the central axis of the nozzle body 140. It is also contemplated that central axes of the peripheral apertures 144 may extend at other angles, such as parallel to the central axis of the nozzle body 140.

The peripheral apertures 144 may be formed through a conical distal region 140b of the nozzle body 140. Shield gas flowing through the interior channel 142 of the nozzle body 140 may be expelled through the peripheral apertures 144 in the direction of the weld zone of a weld assembly 12. The shield gas may be delivered at a rate in the range of approximately 25-45 cubic feet per hour (cfh) (0.56-1.13 cubic meters per hour).

The nozzle body 140 may also include a central aperture 146 that may extend through a distal end of the conical distal region 140b of the nozzle body 140. The central aperture 146 may be disposed about (e.g., may be coaxial with) the central axis of the nozzle body 140, and may be located at the distal end of the integrated feed nozzle 130. The central aperture 146 may have a diameter in the range of approximately 0.5-1.0 millimeters.

The distal end of the nozzle body 140 may define the distal end of the integrated feed nozzle 130 (i.e., the furthest end axially downstream). As such, an outer surface of the conical distal region 140b of the nozzle body 140 forms the outermost surface of the distal end of the integrated feed nozzle 130. In this way, the outermost surface of the distal end of the integrated feed nozzle 130 may define a plurality of apertures (i.e., the one or more peripheral apertures 144 and the central aperture 146).

The integrated feed nozzle 130 may also include a wire feeder 150. The wire feeder 150, which may also be referred to as a liner, may extend through the interior cavity 134 of the inlet manifold 132 and through the interior channel 142 of the nozzle body 140. For example, the wire feeder 150 may be coaxially disposed with the inlet manifold 132 and the nozzle body 140.

Outer surfaces of the wire feeder 150 may be spaced from inner surfaces of the nozzle body 140 such that at least a portion of the interior channel 142 of the nozzle body 140 may be substantially empty. In this way, shield gas may be communicated through the empty portion of the interior channel 142 of the nozzle body 140.

In at least one approach, a distal end region 150a of the wire feeder 150 may engage the inner surface of the conical distal region 140b of the nozzle body 140. For instance, the entire circumferential periphery of the distal end region 150a of the wire feeder 150 may engage the inner surface of the conical distal region 140b of the nozzle body 140. As such, the distal end region 150a of the wire feeder 150 may form a fluid-tight seal with the inner surface of the conical distal region 140b of the nozzle body 140. The fluid-tight seal may be disposed axially between the peripheral apertures 144 and the central aperture 146. In this way, shield gas flowing through the interior channel 142 of the nozzle body 140 may be restricted from reaching the central aperture 146. In this way, shield gas flowing through the nozzle body 140 is directed through the peripheral apertures 144 and is substantially inhibited from flowing upstream through the wire feeder 150.

The wire feeder 150 may be a hollow nozzle body defining an interior channel 152. A welding wire 154 may be fed through the interior channel 152 of the wire feeder 150. The welding wire 154 is preferably metallurgically compatible with the base materials being joined. The wire material may be an alloy having a relatively high composition (by weight) of nickel, chromium, or nickel and chromium. The welding wire 154 may have a diameter in the range of 0.25 and 10 millimeters, and more particularly, in the range of 0.9 and 1.5 millimeters. The welding wire 154 may have a tip region 154a adapted to protrude beyond the central aperture 146 formed through the conical distal region 140b of the nozzle body 140. In this way, the shield gas and welding wire 154 may exit the interior channel 142 of the nozzle body 140 through different apertures.

During welding operations, the tip region 154a of the welding wire 154 may be disposed adjacent a weld zone of a weld assembly 12. Also during welding operations, the laser beam provides sufficient energy to melt the welding wire 154 proximate the weld zone.

As compared to a configuration having separate gas delivery and wire feeding components, the integrated feed nozzle 130 may be a relatively compact local delivery system. For example, proximal region 140a of the nozzle body 140 may have an outer diameter in the range of approximately 6-10 millimeters. The conically-tapered region 140b of the nozzle body 140 may taper from the proximal region 140a to a distal end having an outer diameter of approximately 5 millimeters. Due at least in part to this reduced profile, the integrated feed nozzle 130 may be positioned in tight locations between two workpieces to deliver the shield gas in close proximity to the weld zone. For example, during welding operations, the shield gas may be expelled through peripheral apertures 144 at a height of approximately 12 millimeters to approximately 20 millimeters above the weld zone. The compact configuration of the integrated feed nozzle 130 may also allow the integrated feed nozzle 130 to access weld zones that would not be accessible (or as easily accessible) using a local delivery systems having discrete gas delivery and wire feeding components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for making a welded assembly, the system comprising:
    a welding system that projects a laser beam that welds a first part to a second part; and
    a gas delivery device defining an interior cavity, the gas delivery device including:
        a first body portion that is mounted to a support member and that has an inlet that provides pressurized gas to the interior cavity;
        a second body portion disposed on the first body portion, wherein the first and second body portions cooperate to define the interior cavity and a discharge slot therebetween, wherein the discharge slot receives the pressurized gas from the interior cavity and outputs the pressurized gas toward the laser beam such that the laser beam passes through the pressurized gas and outputs the pressurized gas over a weld zone to inhibit molten metal from being expelled from the weld zone and reaching lenses of a laser head, wherein the laser beam does not pass through the interior cavity, and the second body portion is moveably disposed on the first body portion and includes elongated adjustment apertures that receive fasteners that secure the second body portion to the first body portion and permit adjustment of a width of the discharge slot, and a shield gas delivery device that directs a shield gas toward the weld zone, is mounted to the support member, and is axially positioned closer to the first part and the second part than the gas delivery device, wherein the laser beam does not pass through the shield gas delivery device.

2. The system of claim 1 wherein the pressurized gas has laminar flow is free of eddies at a central axis.

3. The system of claim 1 wherein the discharge slot has a height and a width, wherein a ratio of the height of the discharge slot to the width of the discharge slot is at least 40 to 1.

4. The system of claim 3 wherein the height of the discharge slot is 40 to 60 times greater than the width of the discharge slot.

5. The system of claim 3 wherein the width of the discharge slot is in a range of 0.5 millimeters to 1 millimeter and the height of the discharge slot is in a range of 40 millimeters to 60 millimeters.

6. The system of claim 1 wherein the gas delivery device includes first, second, and third side plates that are mounted on the first body portion and that protect the first body portion from molten metal expelled from the weld zone.

7. The system of claim 1 wherein the discharge slot directs airflow perpendicular to a central axis of the laser beam.

8. The system of claim 1 wherein the first body portion includes a first transverse wall that defines a first beam passage channel, and the second body portion includes a second transverse wall that defines a second beam passage channel.

9. The system of claim 1 wherein the discharge slot is oriented perpendicular to the inlet.

10. A system for making a welded assembly, the system comprising:
    a welding system that projects a laser beam that welds a first part to a second part;
    a gas delivery device that includes:
        a first body portion that is mounted to a support member and that has an inlet that receives pressurized gas;
        a second body portion disposed on the first body portion, wherein the first and second body portions cooperate to define an interior cavity and a discharge slot therebetween, wherein the pressurized gas exits the gas delivery device through the discharge slot and is directed toward the laser beam such that the laser beam passes through the pressurized gas, and over a weld zone to inhibit molten metal from being expelled from the weld zone and reaching lenses of a laser head, wherein the laser beam does not pass through the interior cavity; and
        a first removable plate defining an upper boundary of the discharge slot and a second removable plate defining a lower boundary of the discharge slot; and
    a shield gas delivery device that directs a shield gas toward the weld zone, is mounted to the support member, and is axially positioned closer to the first part and the second part than the gas delivery device, wherein the laser beam does not pass through the shield gas delivery device.

11. The system of claim 10 wherein the second body portion is moveably disposed on the first body portion.

12. The system of claim 11 wherein the second body portion includes elongated adjustment apertures that receive fasteners that secure the second body portion to the first body portion and permit adjustment of a width of the discharge slot.

13. The system of claim 10 wherein the first body portion includes a first transverse wall extending in a first plane orthogonal to a central axis of the laser beam, and the second body portion includes a second transverse wall extending in a second plane orthogonal to the central axis of the laser beam.

14. The system of claim 13 wherein the first transverse wall defines a first beam passage channel, the second transverse wall defines a second beam passage channel, and the laser beam passes through the first beam passage channel and then the second beam passage channel.

15. The system of claim 1 wherein the gas delivery device further comprises a first removable plate defining an upper boundary of the discharge slot and a second removable plate defining a lower boundary of the discharge slot.

16. The system of claim 10 wherein the first and second removable plates are disposed on the first and second body portions.

17. The system of claim 10 further comprising a support assembly that includes a first support member, a second support member fixedly disposed on the first support member, and the support member, the support member being axially positionable with respect to the second support member.

18. The system of claim 17 wherein the shield gas delivery device directs the shield gas toward the weld zone at a non-zero angle with respect to the pressurized gas that exits the gas delivery device.

19. The system of claim 18 wherein the first body portion is disposed between the support member and the second body portion.

20. The system of claim 10 wherein the discharge slot has a height and a width, wherein the width is constant along the height of the discharge slot.

* * * * *